(12) United States Patent
Loukianov

(10) Patent No.: US 8,971,470 B2
(45) Date of Patent: Mar. 3, 2015

(54) SYSTEM, METHOD, AND DEVICE TO DISTRIBUTE ACCURATE SYNCHRONIZATION TIMESTAMPS IN AN EXPANDABLE AND TIMING CRITICAL SYSTEM

(75) Inventor: Dmitrii Loukianov, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 705 days.

(21) Appl. No.: 13/035,623

(22) Filed: Feb. 25, 2011

(65) Prior Publication Data

US 2012/0219099 A1 Aug. 30, 2012

(51) Int. Cl.
*H04L 7/00* (2006.01)
*H04J 3/06* (2006.01)
*G06F 1/14* (2006.01)

(52) U.S. Cl.
CPC .................. *H04J 3/0697* (2013.01); *G06F 1/14* (2013.01)
USPC ............................. 375/357; 370/282; 370/507

(58) Field of Classification Search
USPC ...................... 370/466, 507; 375/357; 713/400
See application file for complete search history.

(56) References Cited

U.S. PATENT DOCUMENTS

| | | | |
|---|---|---|---|
| 8,316,155 B2 * | 11/2012 | Liu et al. ....................... | 709/248 |
| 2002/0073228 A1 | 6/2002 | Cognet et al. | |
| 2002/0163921 A1 * | 11/2002 | Ethridge et al. ............... | 370/401 |
| 2005/0091554 A1 * | 4/2005 | Loukianov .................... | 713/500 |
| 2005/0282570 A1 * | 12/2005 | Pulkkinen et al. ............ | 455/502 |
| 2008/0243950 A1 | 10/2008 | Webman et al. | |
| 2009/0142062 A1 | 6/2009 | Harrison et al. | |
| 2010/0271872 A1 * | 10/2010 | Roohparvar et al. ...... | 365/185.2 |
| 2011/0035511 A1 | 2/2011 | Biederman et al. | |

OTHER PUBLICATIONS

International Search Report and Written Opinion received in PCT Application Serial No. PCT/US2011/067603, mailed Jul. 16, 2012, 8 pages.
"UM10204—PC-bus specification and user manual", User manual, Revision 3, Jun. 19, 2007, pp. 1-50.
"PC", From Wikipedia, The Free Encyclopedia, Retrieved on Feb. 23, 2011, Webpage available at: http://en.wikipedia.org/wiki/I%C2%B2C.
"System Management Bus", The Free Encyclopedia, Retrieved on Feb. 23, 2011, Webpage available at: http://en.wikipedia.org/wiki/SMBus.
Teener, Michael Johas, "Ethernet AV™ summary", Apr. 2006, pp. 1-29.

(Continued)

*Primary Examiner* — Donald Mills
*Assistant Examiner* — Henry Baron
(74) *Attorney, Agent, or Firm* — International IP Law Group, P.L.L.C.

(57) ABSTRACT

Techniques are described to provide a device and network of devices that collect distributed coordinated timestamps from distributed time counters in a multi-module or multi-integrated circuit system. The interconnect between the modules can be a single-wire or a two-wire interconnect. The modules communicatively coupled to the interconnect can use a collision-avoidance protocol for triggering the broadcasting of timestamps among the modules as well for allowing all modules to transmit their timestamps. Timestamps from multiple clocks can be transmitted by all modules and then collected and compared to produce correction factors to clock signals of each module to potentially achieve distributed clock synchronization in multiple independent modules or integrated circuits.

18 Claims, 3 Drawing Sheets

(56) References Cited

OTHER PUBLICATIONS

Teener, Michael Johas, "Standards- based Audio Networks Using IEEE 802.1 AVB", © 2008 Broadcom, 38 pages.

IEEE Std 1588™—2002, IEEE Standard for a Precision Clock Synchronization Protocol for Networked Measurement and Control Systems (2002), 154 pages.

* cited by examiner

SYSTEM, METHOD, AND DEVICE TO DISTRIBUTE ACCURATE SYNCHRONIZATION TIMESTAMPS IN AN EXPANDABLE AND TIMING CRITICAL SYSTEM

FIELD

The subject matter disclosed herein relates generally to event time stamp generation and time stamp distribution in a system with a plurality of clocks to potentially achieve clock synchronization between a plurality of components in the system.

RELATED ART

Many digital devices use clocks to coordinate operations. When multiple digital devices inter-operate, it is desirable to have clock synchronization among the devices. For example, in media systems, it is desirable to synchronize operations of an audio decoder and a video decoder so that audio output is in synch with corresponding video. In multi-point data acquisition systems, data samples must be taken with an accurate time relationship and associated timestamps are recorded on a recording device together with captured data. For example, in cable modems, the transmission in the upstream direction must be synchronized with the transmission opportunities communicated through the downstream.

When it is possible to specify use cases and the components are developed with this assumed use case in mind, the designer can provide a special interface and interconnect to coordinate synchronization. When the entire system is located on a single die (e.g., system-on-chip (SoC)), providing an interconnect is feasible as external device terminals are not constrained in the implementation. However, if the time stamp coordination spans across multiple physical devices (in the form of integrated circuits or functional modules), it is desirable to reduce terminal count for synchronization to an absolute minimum. In some cases, what is needed is a low pin count interface suitable for heterogeneous coordinated time stamping and distribution of the corresponding timestamps between multiple physical devices.

BRIEF DESCRIPTION OF THE DRAWINGS

Embodiments of the present invention are illustrated by way of example, and not by way of limitation, in the drawings and in which like reference numerals refer to similar elements. For evolving systems with the capability to add components, it is desirable to provide synchronization between added components.

DETAILED DESCRIPTION

Figure 1:
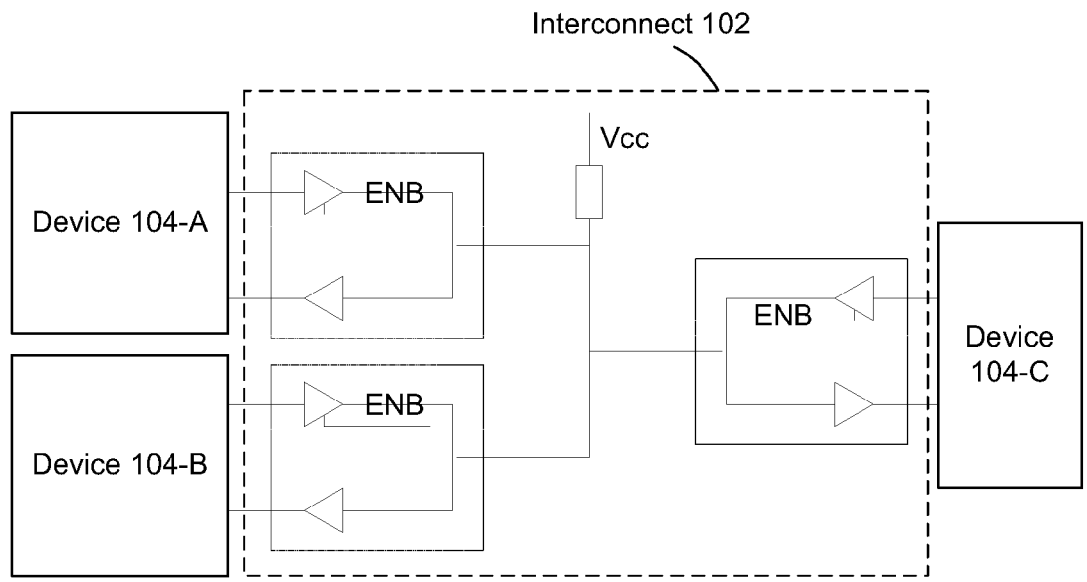
FIG. 1 depicts an example of a system of devices where the devices are communicatively coupled using an interconnect.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Various embodiments provide a device and network of devices that collect distributed coordinated timestamps from distributed time counters in a multi-module or multi-integrated circuit system. The interconnect between the modules can be a single-wire or a two-wire interconnect. The modules communicatively coupled to the interconnect can use a collision-avoidance protocol for triggering the broadcasting of timestamps among the modules as well for allowing all modules to transmit their timestamps. The collision-avoidance protocol can be made compatible with I2C. Timestamps from multiple clocks can be transmitted by all modules and then collected and compared to produce correction factors to clock signals of each module to potentially achieve distributed clock synchronization in multiple independent modules or integrated circuits.

For example, in the system, if CLK_B is variable, the desired ratio between clocks CLK_A and CLK_B can be expressed by the ratio M/N, and the coordinated timestamps from these clocks at two different instances of time can be read as (TS_A1, TS_B1) and (TS_A2 and TS_B2) respectively. Then the equation (TS_A2−TS_A1)*M=(TS_B2−TS_B1)*N holds if the clock frequencies are synchronized. The error signal Err=(TS_A2−TS_A1)*M−(TS_B2−TS_B1)*N represents the difference between clock rates, and the tracking system can minimize the difference by adjusting the variable clock. The phase synchronization may be achieved by sending a command to reset the phase of oscillators at predefined time when the frequency synchronization is achieved. A digital or analog tracking loop may be utilized by the tracking system with the error signal as an input.

Accordingly, clock sources of multiple independent modules or integrated circuits may potentially achieve mutual or selected group synchronization. For example, the independent modules or integrated circuits can be wireless or wired network interfaces. Synchronization of distributed clock sources can be used for synchronization of a network clock and/or audio/video clocks of networked multimedia modules or for synchronization of media and transport clocks in wireless or wired video distribution systems.

Various embodiments provide a method for devices that are communicatively coupled to an interconnect to use the interconnect to communicate when one of the devices is going to capture a time stamp and also to invoke other devices to take a coordinated time stamp and communicate the time stamps using the interconnect without collision. One embodiment of an interconnect can have an open drain, open collector, or similarly wired-OR bi-directional interface transceiver configuration. To prevent collision of time stamps, devices that use the interconnect may implement an arbitration scheme that compares the data line while driving it with the desired data. If the data in the interconnect does not match the driven value, the transmitter stops driving data because another, higher priority unit is winning arbitration. In some cases, an I2C compatible interface can be used both to initiate the coordinated time stamping and to communicate the timestamps between units.

When every device attempts to transmit their device identifier on the interconnect, priority is given to the device with the lowest identifier. The number of bits in the identifier is based on the number of devices couplable to the interconnect. For example, the number of bits could be two for a four device interconnect.

FIG. 1 depicts an example of a system of devices where the devices are communicatively coupled using an interconnect. Devices 104-A to 104-C can use interconnect 102. Interconnect 102 can include one or two conductive paths. In an embodiment where interconnect 102 is a single wire, an asynchronous communication method and bit timing can be based on universal asynchronous receiver/transmitter (UART). In another embodiment, interconnect 102 can use a two-wire system management bus (SMB) to initiate the transmission of time stamps and to arbitrate conflicts among transmissions of time stamps. SMB is described in SBS Implementers Forum, System Management Bus (SMBus) Specification, Version 2.0 (Aug. 3, 2000).

As depicted, interconnect 102 uses an open drain, open collector, or similarly wired-OR bi-directional interface with each of devices 104-A to 104-C.

Interconnect 102 can use a conflict resolution technique similar to that of I2C when multiple devices attempt to transmit to interconnect 102 simultaneously. The conflict resolution technique of I2C is described in section 3.8 of I2C-Bus Specification and User manual, UM 10204 (2007). The interconnect makes it feasible to trigger a time stamping process on all connected devices within 20-100 ns relative to each other and the timestamp initiator.

Devices 104-A to 104-C can be any type of device that uses a clock signal. For example, devices 104-A to 104-C can be any of wireless or wired network interfaces, real time process control or automation, audio encoders or decoders, or video encoders or decoders. Each of devices 104-A to 104-C can be implemented as an integrated circuit. For example, an event causes device 104-A to determine a time stamp of its clock and subsequently broadcast the time stamp using interface 102. The event that triggers time stamping can be the start of new video frame, vertical or horizontal synchronization pulse in TV, global timer tick, start of the audio sample block or a SYNC frame in MPEG transport stream, but is not limited to listed event types.

Device 104-A pulls the interconnect 102 to state zero to indicate a time stamp determining event ("TS Event") has occurred. Pulling interconnect 102 to state zero causes transmission of a zero for a bit signaling period. Device 104-A determines its time stamp. In addition, devices 104-B and 104-C recognize that a TS Event has occurred and in response, devices 104-B and 104-C capture their own time stamp from their own timebase. A time base can include a local time source or clock and a time counter which monotonically increments or decrements its count on every period of the clock. At the same time, all devices 104-A to 104-C attempt to use interconnect 102 to serially transmit their identifier assigned when the system was manufactured or assembled.

As all devices attempt to transmit their identifiers and simultaneously monitor the state of the interconnect, the arbitration process selects only one device which has the highest priority. Other devices will stop driving the interconnect, and arbitrated device will remain active. The arbitration scheme permits the device with the lowest preamble number to subsequently transmit its time stamp value using interconnect 102. After the device with the lowest identifier transmits its time stamp, the devices that were not able to transmit their time stamp can retry the attempt to transmit their time stamp. Again, the device with the lowest identifier wins. The process repeats until all devices transmit their time stamps.

Devices 104-A to 104-C can use the time stamps from other devices to synchronize their clock sources, where the device ID transmitted together with the timestamp is not only used for arbitration, but also identifies the unit to which the timestamp belongs. For example, devices 104-B and 104-C can compare the received time stamp from device 104-A to their own locally clocked counter values to measure drift errors. The drift error values can be used to adjust oscillator frequency to synchronize clocks of devices 104-B and 104-C to a clock of device 104-A. One possible application of the method is to adjust the frequencies of tunable display and audio clock (e.g., doppler phase locked loop) for synchronized and uninterrupted playback.

One of the transmitted time stamps is associated with a master clock signal. A device can indicate if its clock signal is the master clock signal. For example, IEEE 1588 specifies that devices can indicate their clock accuracy. The clock with the highest accuracy can be the master clock. In some cases, a system wide transmission (e.g., broadcast) identifies the master clock. The transmission can be made using the interconnect.

In some cases, consumer electronic (CE) devices with clock sources can be communicatively coupled to a personal computer and the CE devices can use the interconnect to synchronize their clocks with components of the personal computer or vice versa. CE devices with clock sources can be communicatively coupled to other CE devices and the CE devices can use the interconnect to synchronize their clocks with the other CE devices. Similarly, components can be added to a personal computer and use the interconnect to synchronize clocks with some components of the personal computer.

If all devices are trying to transmit their time stamps after a first TS Event and a device has another TS Event, the devices are free to select the time when each may want to trigger the coordinated time stamping. This potentially may lead to more than one device attempting to trigger a TS Event. In some cases, the first TS event leads to transmission of timestamps in the connected system, and once timestamp transmission has started, the other TS Events are cancelled and blocked. In the worst-case situation, two devices may not recognize the other's TS Event due to propagation delays in the interconnect and they may transmit inaccurate timestamp values, leading to a maximum error equal to propagation delay.

In some cases, the interface to the interconnect is a bidirectional optical interconnect system and communication of bits occurs by modulating optical radiation. Collision avoidance involves detecting monitoring optical signal intensity or phase to determine if a signal different from that transmitted by the interface is communicated by the interconnect.

Figure 2:
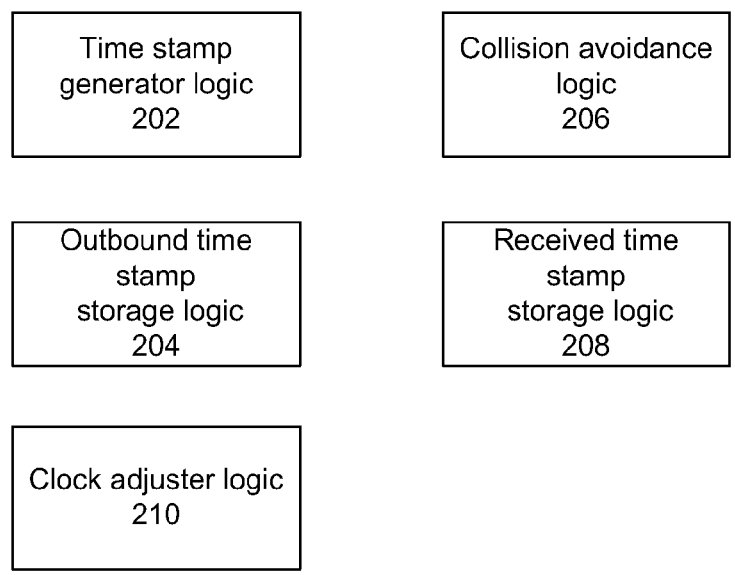
FIG. 2 depicts components used by a device to transmit time stamps to an interconnect and receive time stamps from the interconnect.

FIG. 2 depicts components used by a device to transmit time stamps to an interconnect and receive time stamps from the interconnect. Time stamp generator logic 202 can determine time stamps of a clock source to a device. Time stamps can be determined using a time base, which can include a local time source or clock and a time counter which monotonically increments or decrements its count on every period of the clock. Outbound time stamp storage logic 204 can store the time stamp of the device for future transmission. The format of the time stamp can be [ID7, TS32], where ID7 is I2C standard IC address and TS32 is a 32-bit snapshot of the local time base counter in this device. Collision avoidance logic 206 can use a technique compatible with I2C to determine whether its device can transmit using the interconnect. Received time stamp storage logic 208 can store one or more time stamps from other devices that were received using the interconnect.

Clock adjuster logic 210 can compare received time stamps with the locally clocked time stamp to measure drift errors. The drift error values can be used to adjust oscillator frequency of the clock used by the device.

Figure 3:
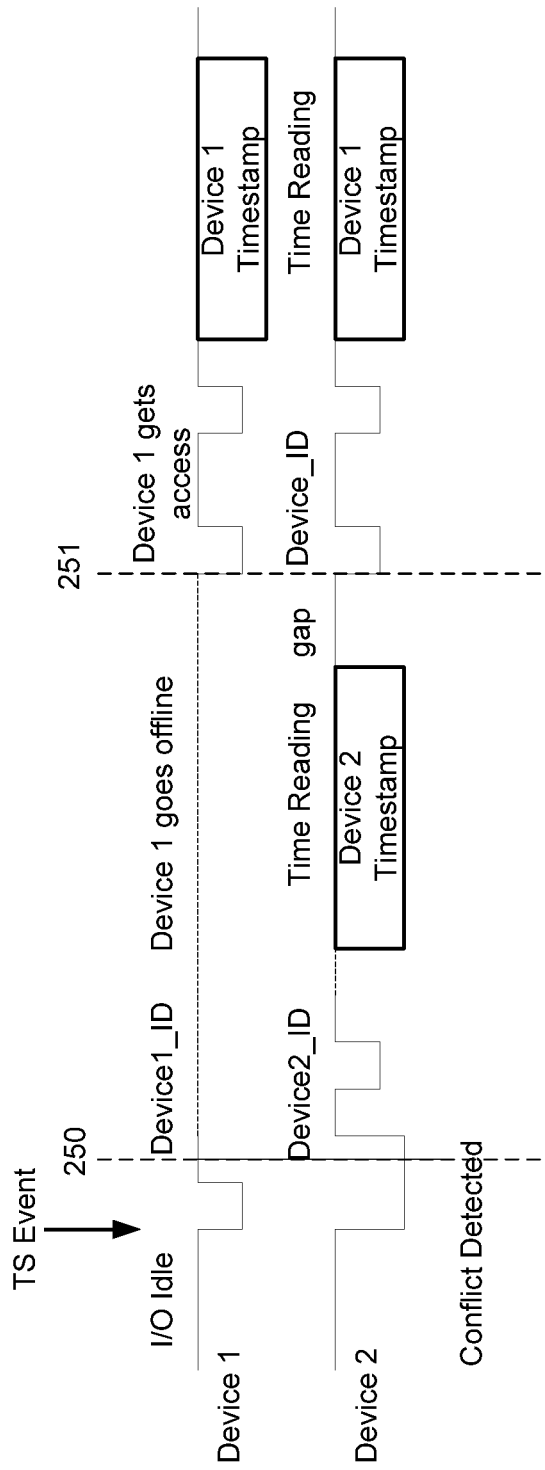
FIG. 3 depicts an example timing diagram in which devices attempt to transmit time stamps.

FIG. 3 depicts an example timing diagram in which devices attempt to transmit time stamps. Before TS Event, some internal or external event in Device 1 tells Device 1 to generate its TS. The event causes Device 1 to determine its TS and transmit the TS on the interconnect. Device 1 pulls wire to zero to indicate a TS Event has occurred. The TS Event is "at will" in time and occurs when any device in the system wishes to issue a timestamp. Pulling down the wire causes transmission of a "0" for one signaling period. The TS Event can be treated as the start of a first pulse, whose duration is assumed to be one bit interval. Other devices recognize the TS Event and in response, other devices determine their own time stamps regardless of whether there is an internal TS event. In the next signaling period after the TS Event, at approximately the same time, all devices attempt to transmit their device identifier.

In asynchronous transmission mode (UART), the duration of the bit intervals is determined automatically, from the duration of the bits, using commonly known techniques called autobaud. When an I2C-compatible protocol is used by the interconnect, each transmitter uses a clock signal for timing transmitted bits.

For example, an identifier can have two bits, b0 followed by bit b1. For a first bit b0, any device whose b0 is a 0 pulls the interconnect to zero which does not allow other devices with an identifier having a b0 of 1 to transmit. Next, for second bit b1, a b1 of 0 similarly only permits the device with the b0b1 of 00 to transmit until the interconnect is freed. An identifier of b0b1 of 00 allows its device to transmit its time stamp first. A device that has an identifier b0b1 of 11 will transmit its time stamp last. Devices know that they do not pull a wire to zero because they have a receiver that detects a different level on the interconnect than that transmitted by the device. Devices that were not able to transmit their time stamps go offline and store their time stamps in memory and subsequently transmit their identifiers again. The device with the lowest identifier is permitted to transmit its time stamp. The process repeats until the device with the highest identifier transmits its time stamp.

Referring again to the example of FIG. 3, at 250, device 1 and device 2 transmit their identifiers. Device 2 has the lowest device identifier and is permitted to transmit its time stamp before Device 1. While device 2 transmits its time stamp, device 1 goes offline and stores its time stamp to transmit later. After device 2 transmits its time stamp, then at 251, device 1 transmits its identifier again and because device 1 has the lowest identifier value.

Figure 4:
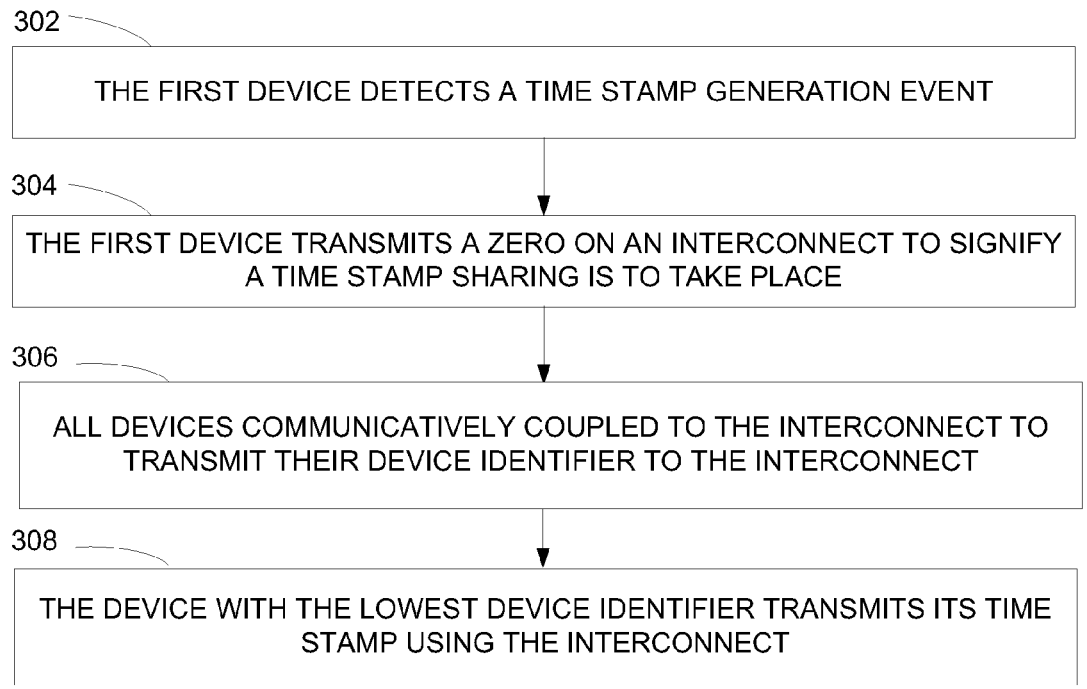
FIG. 4 depicts an example process in accordance with an embodiment.

FIG. 4 depicts an example process in accordance with an embodiment. Block 302 includes a first device detecting a time stamp generation event. The event that triggers time stamping can be the start of new video frame, vertical or horizontal synchronization pulse in TV, global timer tick, start of the audio sample block or a SYNC frame in MPEG transport stream, but is not limited to listed event types.

Block 304 includes the first device transmitting a zero on an interconnect to signify a time stamp sharing is to take place. The interconnect can include one or two wires. The interconnect can include an open drain, open collector, or similarly wired-OR bi-directional interface for interfacing with the first device and other devices.

Block 306 includes all devices communicatively coupled to the interconnect transmitting their device identifier to the interconnect. Synchronized transmission of the identifiers causes a collision between the identifiers. A conflict resolution technique of I2C is used to determine which device is permitted to transmit. The device with the lowest device identifier value is permitted to transmit its time stamp using the interconnect.

Block 308 includes the device with the lowest device identifier value transmitting its time stamp using the interconnect. Blocks 306-308 repeat until all devices on the interconnect have transmitted their time stamps. Devices are able to receive time stamps transmitted from other devices. Devices can use the received time stamps to synchronize their clock source using the received time stamps.

Figure 5:
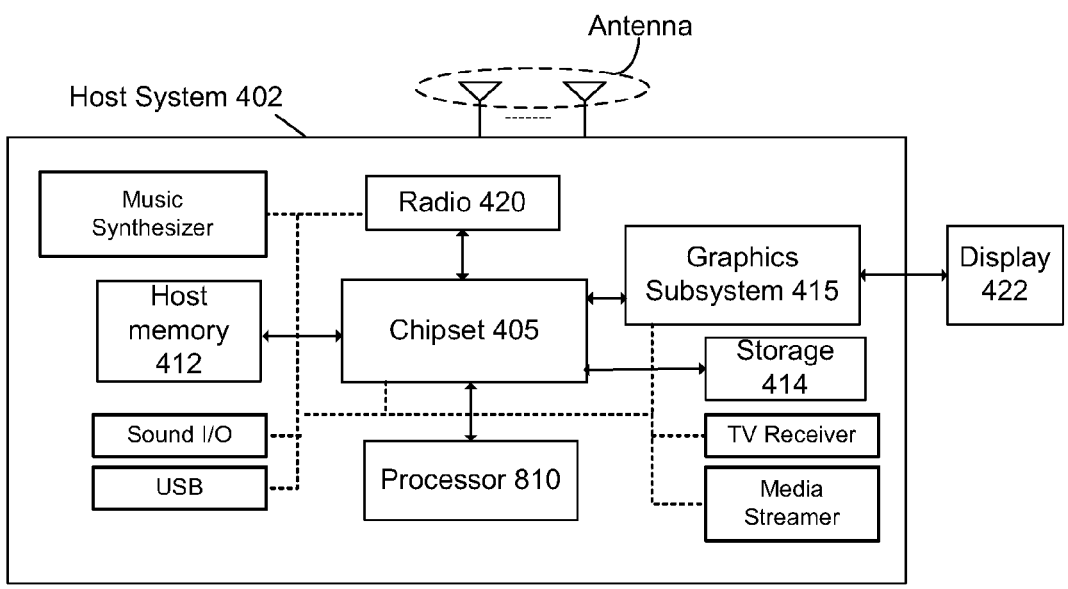
FIG. 5 provides an example of a system in accordance with an embodiment.

FIG. 5 provides an example of a system in accordance with an embodiment. The system can be used in a mobile station, user element, netbook, handheld computer, handheld phone, and so forth. Computer system 400 may include host system 402 and display 422. Computer system 400 can be implemented in a handheld personal computer, mobile telephone, set top box, or any computing device. Any type of user interface is available such as a keypad, mouse, touch screen, and/or gesture or motion recognition. Host system 402 may include chipset 405, processor 410, host memory 412, storage 414, graphics subsystem 415, and radio 420. Chipset 405 may provide intercommunication among processor 410, host memory 412, storage 414, graphics subsystem 415, and radio 420. For example, chipset 405 may include a storage adapter (not depicted) capable of providing intercommunication with storage 414.

An interconnect between devices is shown as a dotted line. Each device can include features described herein to perform time stamp generation and synchronization.

Processor 410 may be implemented as Complex Instruction Set Computer (CISC) or Reduced Instruction Set Computer (RISC) processors, x86 instruction set compatible processors, multi-core, or any other microprocessor or central processing unit.

Host memory 412 may be implemented as a volatile memory device such as but not limited to a Random Access Memory (RAM), Dynamic Random Access Memory (DRAM), or Static RAM (SRAM). Storage 414 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 415 may perform processing of images such as still or video for display. An analog or digital interface may be used to communicatively couple graphics subsystem 415 and display 422. For example, the interface may be any of a High-Definition Multimedia Interface, DisplayPort, wireless HDMI, and/or wireless HD compliant techniques. Graphics subsystem 415 could be integrated into processor 410 or chipset 405. Graphics subsystem 415 could be a stand-alone card communicatively coupled to chipset 405.

Radio 420 may include one or more radios capable of transmitting and receiving signals in accordance with applicable wireless standards such as but not limited to any version of IEEE 802.11 and IEEE 802.16. For example, radio 420 may include at least a physical layer interface and media access controller. Radio 420 can include a baseband processor to perform techniques described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multicore processor. In a further embodiment, the functions may be implemented in a consumer electronics device.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A device comprising:
    an interface to an interconnect system, wherein when the interface is communicatively coupled to the interconnect system, the interface is to receive initiation of a time stamping event from the interconnect system;
    a time base comprising a clock and a time counter which is to increment or decrement its count each period of the clock;
    a time stamp generator to capture a count of the time base associated with the device, the time stamp generator to use the interface to transmit a time stamp event indicator to the interconnect system and also to transmit a device identifier to the interconnect system, wherein the interface is to transmit signals to simultaneously initiate the time stamping event in one or more other devices and to trigger transmission by the one or more other devices of device identifiers and timestamps to the interconnect system; and
    collision avoidance logic to determine whether the device is permitted to transmit its time stamp using the interconnect system, wherein the time stamp generator is to wait for a period of time and transmit the device identifier to the interconnect system again in response to the device not being permitted to transmits its time stamp, and wherein the interface comprises a bidirectional optical interconnect system and communication of bits occurs by modulating optical radiation and wherein collision avoidance logic is to detect collisions by monitoring optical signal intensity or phase to determine if a signal different from that transmitted by the interface is communicated by the interconnect system.

2. The device of claim 1, wherein the interface is configured in one of: an open collector, open drain, and a wired-OR configuration.

3. The device of claim 1, wherein the time stamp event indicator is to trigger at least one other device communicatively coupled to the interconnect system to determine its time stamp, to transmit its device identifier to the interconnect system, and to transmit its coordinated time stamp to the interconnect system if its device identifier is the lowest value.

4. The device of claim 1, wherein the collision avoidance logic is to determine that the time stamp generator is permitted to transmit its time stamp using the interface if the associated device identifier is the lowest value.

5. The device of claim 1, wherein the collision avoidance logic is utilize a collision-avoidance protocol compliant with I2C.

6. The device of claim 1, further comprising:
    in response to the again transmitted device identifier being the lowest value, the time stamp generator is to transmit the time stamp associated with the device identifier to the interconnect system using the interface.

7. The device of claim 1, further comprising:
    time stamp storage to store any time stamp received from the interconnect system.

8. The device of claim 1, wherein the interconnect system comprises a single or two wire hardware interconnect.

9. The device of claim 1, further comprising:
    a clock adjuster logic to compare received time stamps with the time stamp of the device to measure drift errors and to adjust an oscillator frequency of a clock used by the device to synchronize with one of the received time stamps.

10. A method comprising:
    each of at least two devices coupled to an interconnect receiving an indication to determine its time stamp, wherein the interconnect sends the indication to each of the at least two devices, and an interface to the interconnect comprises a bidirectional optical interconnect system and communication of bits that occurs by modulating optical radiation and wherein collision avoidance logic is to detect collisions by monitoring optical signal intensity or phase to determine if a signal different from that transmitted by the interface is communicated by the interconnect system;
    each of the at least two devices determining its time stamp;
    each of the at least two devices transmitting its identifier to the interconnect;
    a device with the lowest identifier transmitting its time stamp to the interconnect;
    each of the at least two devices, other than the device with the lowest identifier, receiving the time stamp;
    each of the at least two devices, other than the device with the lowest identifier, transmitting its identifier to the interconnect; and a second device with the second lowest identifier transmitting its time stamp to the interconnect.

11. The method of claim 10, wherein each of the at least two devices that receives a time stamp from another device synchronizes its clock to a clock of one of the devices.

12. The method of claim 10, wherein each of the at least two devices that receives a time stamp from another device synchronizes its clock to a network or multi-media clock of one of the devices.

13. The method of claim 10, wherein each of the at least two devices is an independent module or integrated circuit.

14. The method of claim 10, wherein each of the at least two devices are selected from among a wireless or wired network interface, an audio encoder, an audio decoder, a video encoder, and a video decoder.

15. A system comprising:
a network medium;
a network interface communicatively coupled to the network medium;
an interconnect;
a plurality of devices communicatively coupled to the interconnect, wherein each of the devices comprises:
an interface to the interconnect, wherein the interconnect system is to initiate a time stamping event in one or more other devices;
a time base comprising a clock and a time counter which is to increment or decrement its count each period of the clock;
a time stamp generator to capture a count of the time base associated with the device, the time stamp generator to use the interface to transmit a time stamp event indicator to the interconnect and also to transmit a device identifier to the interconnect, wherein the interface is to transmit signals to simultaneously initiate the time stamping event in one or more other devices and to trigger transmission by the one or more other devices of device identifiers and timestamps to the interconnect;
collision avoidance logic to determine whether the device is permitted to transmit its time stamp using the interconnect, wherein the time stamp generator is to wait for a period of time and transmit the device identifier to the interconnect again in response to the device not being permitted to transmits its time stamp, and
a clock adjuster logic to compare received time stamps with the time stamp of the device to measure drift errors and to adjust an oscillator frequency of a clock used by the device to synchronize with one of the received time stamps.

16. The system of claim 15, wherein the interface is configured in one of: an open collector, open drain, and a wired-OR configuration.

17. The system of claim 15, wherein the time stamp event indicator is to trigger at least one other device communicatively coupled to the interconnect to determine its time stamp, to transmit its device identifier to the interconnect, and to transmit its coordinated time stamp to the interconnect if its device identifier is the lowest value.

18. The system of claim 15, wherein the interconnect comprises a single or two wire hardware interconnect.

* * * * *